(No Model.)
A. KAYSER.
METHOD OF DEODORIZING HYDROCARBON OILS.
No. 508,479. Patented Nov. 14, 1893.
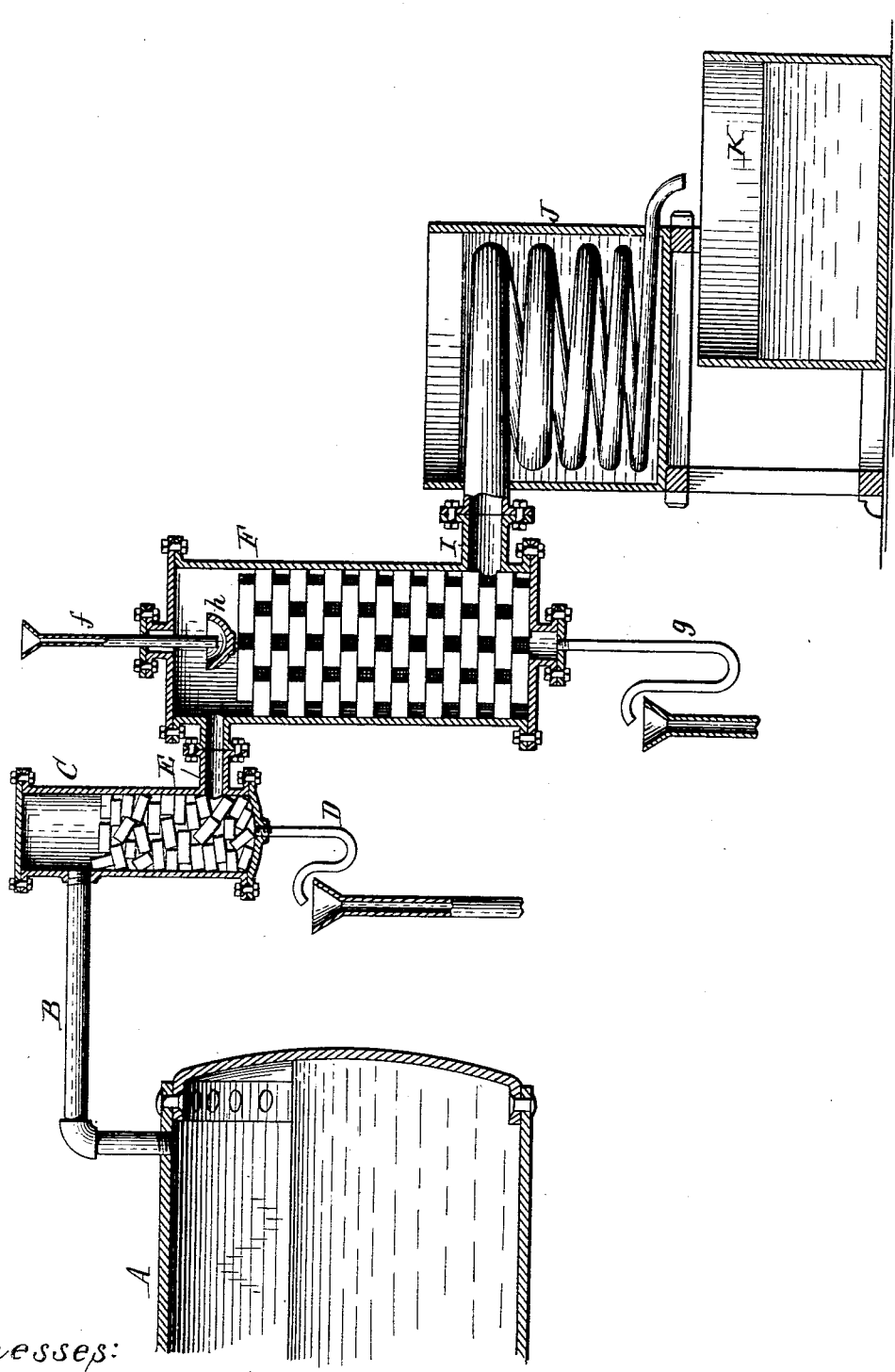
Witnesses:
Emil Neuhart.
Chas. F. Burkhardt.
Adolf Kayser Inventor.
By Wilhelm Bonner
Attorneys.

UNITED STATES PATENT OFFICE.

ADOLF KAYSER, OF BUFFALO, NEW YORK.

METHOD OF DEODORIZING HYDROCARBON OILS.

SPECIFICATION forming part of Letters Patent No. 508,479, dated November 14, 1893.

Application filed November 28, 1892. Serial No. 453,418. (No specimens.)

*To all whom it may concern:*

Be it known that I, ADOLF KAYSER, a citizen of the United States, residing at Buffalo, in the county of Erie and State of New York, have invented new and useful Improvements in Methods of Deodorizing Hydrocarbon Oils, of which the following is a specification.

This invention has for its object to deodorize the lighter grades of petroleum derivatives, such as gasoline, naphtha and illuminating oils, so as to produce oils which are free from their original objectionable odor and which possess no new foreign odor. This object is attained by subjecting these petroleum derivatives in the condition of vapor to the action of anhydrous nitric acid or to that acid in connection with hypochlorous acid.

The accompanying drawing is a sectional elevation of an apparatus which may be employed in practicing my invention.

The crude petroleum is distilled in a retort A, of any usual construction in any usual manner. The resulting vapor is first freed, if necessary, from its water by bringing it in contact with calcium chloride, concentrated sulphuric acid, or in any other suitable manner. In the drawing the discharge pipe B of the retort delivers the vapor to the upper end of a vessel C, which is filled with pieces of calcium chloride or with vitrified bricks over which concentrated sulphuric acid is caused to trickle. The resulting liquid escapes from the bottom of this vessel through a trapped pipe D, and the dried vapor escapes near the bottom through a pipe E. This drier is jacketed or otherwise properly protected to prevent condensation of the vapor. The dried vapor is next subjected to the action of anhydrous nitric acid whereby the sulphur compounds and uncombined or ill-smelling hydrocarbons are broken up and oxidized. In the apparatus represented in the drawing, a scrubber or vessel F is provided for this purpose, which is filled with vitrified bricks and to which a mixture of nitric acid and concentrated sulphuric acid is supplied through a pipe $f$ at the top. I employ, preferably, one part of commercial nitric acid, to from two to three parts of concentrated sulphuric acid of 66° Baumé which results in anhydrous nitric acid and diluted sulphuric acid. This acid mixture enters a cup $h$ from which it overflows and trickles over the bricks in the scrubber. The anhydrous nitric acid is evaporated and mixes with the petroleum vapor.

The amount of acid which is supplied to the scrubber depends upon the nature of the vapor which is treated, whether more or less impure, the temperature, and other conditions. I have found that one pound of nitric acid to each barrel of naphtha produced is a proportion which produces good results. The resulting diluted acid escapes from the bottom of the scrubber through a trapped pipe $g$ and the purified vapor escapes near the bottom through a pipe I. This scrubber also is jacketed or otherwise protected to prevent condensation of the vapor.

Instead of employing simply anhydrous nitric acid, a mixture of that acid with hypochlorous acid may be employed. This mixture is produced by supplying the scrubber with nitric acid, muriatic acid and concentrated sulphuric acid. The anhydrous nitric acid destroys the sulpho-hydrocarbons and other ill-smelling hydrocarbon compounds, the sulphur being in part oxidized and in part otherwise rendered inocuous and finally eliminated by the subsequent treatment. When no sulpho-hydrocarbons are present, a smaller proportion of anhydrous nitric acid is sufficient to effect the desired result.

In practicing my invention, it is necessary to so regulate the supply of acid and the temperature that no new odoriferous or otherwise objectionable compounds are formed. For instance, an excess of acid and a very high temperature are liable to produce odoriferous nitro compounds which should be avoided in order to produce oils which have a neutral character and are free from foreign odors. The anhydrous nitric acid or nitric anhydride ($N_2O_5$) which is produced by the action of concentrated sulphuric acid upon nitric acid, is split up, when brought in contact with bodies capable of being oxidized, into nitric peroxide ($NO_2$) and active oxygen, and this oxygen at once combines with such bodies, for instance the ill smelling hydrocarbons, and oxidizes them. The hypochlorous acid is beneficial in preventing the formation of odoriferous nitro compounds, such as nitro-benzole, toluol, &c. An excess of nitric peroxide is liable to cause the formation of such nitro compounds, which, although not ill smelling, have an odor which is undesirable in an oil which is intended to be neutral or free from foreign odors. The purified vapor passes from the scrubber into a condenser J, of any suitable construction from which the condensed liquid passes into a receiver K. The product of this condensation has an acid reaction and consists of a slightly yellowish oil mixed with a very small percentage of water. The yellow color results from the presence of oxidized substances of the hydrocarbon line which will be the more abundant the higher the temperature and the greater the volume of acid which has been employed. These substances are removed by treating the oil in a receiver with caustic lime, caustic soda, or some other suitable alkali. I prefer caustic lime on account of its cheapness. This treatment completely removes the coloring matter contained in the oil and neutralizes the acid which has been carried over into the condenser. I have found that a distillate which was colorless when produced and which was not treated with an alkali acquired a yellowish tinge in course of time. This is entirely avoided by the alkali treatment. The oil may then be further purified by treating it with sulphuric acid and washing it in the usual manner.

In case hypochlorous acid has been employed, a second washing with diluted sulphuric acid is needed to eliminate the chlorine compounds.

I claim as my invention—

1. The herein described method of deodorizing hydrocarbon oils which consists in subjecting their vapors to the action of anhydrous nitric acid, substantially as set forth.

2. The herein described method of deodorizing hydrocarbon oils which consists in subjecting their vapors to the action of anhydrous nitric acid in connection with hypochlorous acid, substantially as set forth.

3. The herein described method of deodorizing hydrocarbon oils which consists in drying their vapors and then subjecting the dried vapors to the action of anhydrous nitric acid, substantially as set forth.

4. The herein described method of deodorizing hydrocarbon oils which consists in subjecting their vapors to the action of anhydrous nitric acid, condensing the vapors, and removing the color by treatment with a suitable alkali, substantially as set forth.

Witness my hand this 25th day of November, 1892.

ADOLF KAYSER.

Witnesses:
CARL F. GEYER,
FRED. C. GEYER.